July 26, 1966 D. C. BRUNTON ETAL 3,263,077
MASS DETERMINATION OF A FLUENT MATERIAL BY
RADIOACTIVE MEASURING MEANS
Filed Aug. 30, 1961 2 Sheets-Sheet 1

INVENTORS
Donald C. Brunton
James M. McMullen
By Anthony D. Cunamo

July 26, 1966 D. C. BRUNTON ETAL 3,263,077
MASS DETERMINATION OF A FLUENT MATERIAL BY
RADIOACTIVE MEASURING MEANS
Filed Aug. 30, 1961 2 Sheets-Sheet 2
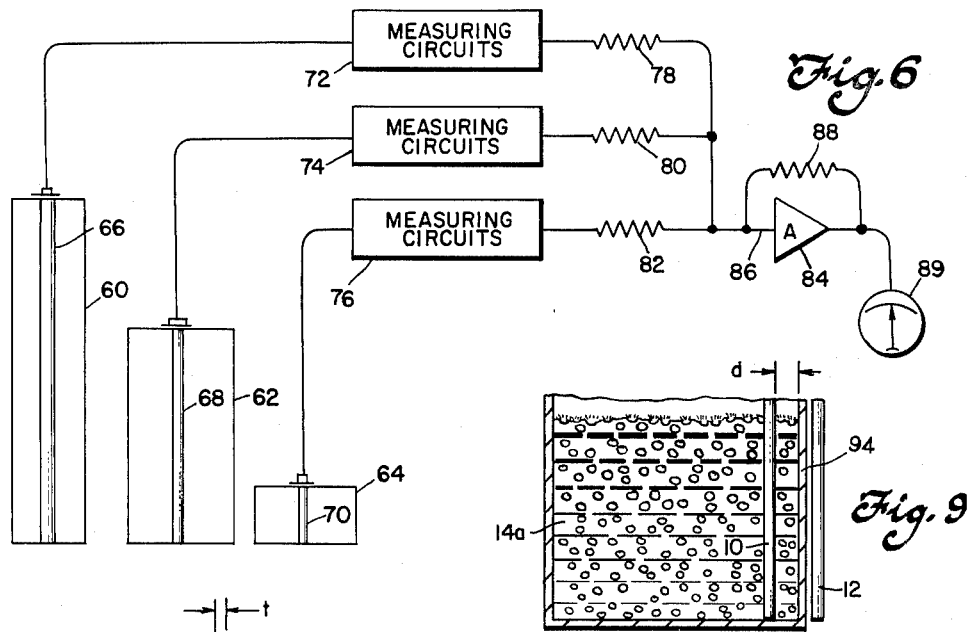
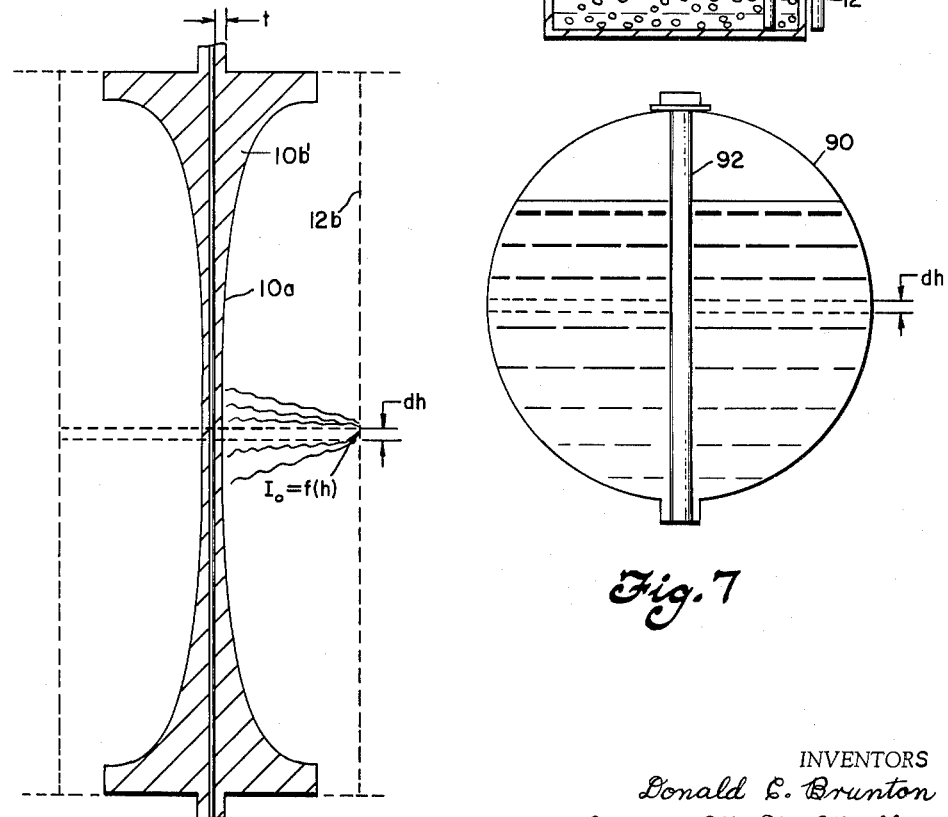
INVENTORS
Donald C. Brunton
James M. McMullen
BY Anthony W. Cennamo

United States Patent Office 3,263,077
Patented July 26, 1966

3,263,077
MASS DETERMINATION OF A FLUENT MATERIAL BY RADIOACTIVE MEASURING MEANS
Donald C. Brunton and James M. McMullen, Columbus, Ohio, assignors to Industrial Nucleonics Corporation, a corporation of Ohio
Filed Aug. 30, 1961, Ser. No. 135,047
5 Claims. (Cl. 250—43.5)

This invention relates to apparatus for measuring the quantity of liquid in tanks, and more particularly it relates to a penetrative radiation gauging system particularly adapted for aircraft fuel tanks and the like, whereby the mass of the fuel, rather than simply the fill height or volume, is directly indicated.

It has previously been proposed to measure liquid level by means of a penetrative radiation source and detector unit. For example, in Patent No. 2,933,601 there is disclosed a radiation source comprising an elongated strip or rod having a beta ray emitting radioactive material uniformly deposited thereon, and a radiation detector coextensive in length with the source. The source and detector are spaced from each other and suspended vertically in the tank, the spacing being such that the beta radiation is completely absorbed by the liquid in that portion of the space between the source and detector that is filled with the liquid, and since the detector output is thereby made linearly proportional to the lengh of the source and detector portions that extend out of the liquid, a linear measure of fill height results.

It has also been proposed to employ a radiation source and detector for measuring the density of liquids in a container or flowing through a pipe. In this type of measurement, the apparatus is arranged so that the liquid always fills the space between the source and detector, the spacing being such that a variable portion of the radiation from the source is able to penetrate the fluid-filled region and impinge upon the detector. This variable portion of the source radiation is dependent on the absorbing mass of the liquid between the source and detector, and since the liquid is constrained to a constant, specific volume, said mass is determined by the fluid density, which is indicated by the detector output. One very efficient apparatus for making the density measurement is disclosed in Patent No. 2,735,944, which shows and describes a liquid-carrying conduit having a radioactive source centrally located therein, and a cylindrical ionization chamber detector surrounding the periphery of the conduit for detecting radiation from the source which radially penetrates the liquid and the walls of the conduit.

While the present invention is obviously readily adapted for diverse commercial applications, it will be herein illustrated and described as a specific embodiment designed to measure and continuously indicate the mass of liquid in aircraft fuel tanks. It appears that at present most instruments for this purpose are based on the capacitance gauge principle, which is adapted to measure the fill level of dielectric fluids. However, it is understood that this system has certain shortcomings with respect to reliability, applicability to all types of fuels, and in particular with respect to the fact that the measurement is one of volume rather than mass.

Obviously mass is the real quantity of interest since it indicates the energy content of the fuel remaining in the tanks and is readily converted to flying time under specific flight conditions. However, as a mass indication the fill height or volume measurements are subject to substantial errors dependent on fuel density changes which occur as a result of the use of different fuels or even with a specific fuel under modern aircraft operating conditions where wide ambient temperature changes are encountered.

This problem has been recognized, and an attempt made to solve the problem through the use of penetrative radiation gauging techniques, as appears for example from the specification of Patent No. 2,952,774. In general it has been proposed to utilize a multiplicity of radioactive sources adjacent the bottoms of the tanks, a multiplicity of detectors adjacent the tops of the tanks and a complex electromechanical computer system for combining and proportioning the various detector outputs so as to provide a net output signal indicative of the total mass of fuel in the tanks. While this system is operable in theory, it presents almost insurmountable difficulties in practice, particularly due to the fact that it employs a radiation geometry that is non-linear with respect to fill height and non-linear with respect to density, in addition to the fact that many aircraft fuel tanks must unavoidably be of irregular shape, requiring arbitrarily non-linear computer conversion of fill height and density to mass as a function of volume. Hence it requires an array of custom-made radiation sources whose intensity and location with respect to the tanks and the detectors must be determined individually and collectively by cut-and-try methods, and it requires a complicated computer system which may utilize a multiplicity of ganged, servo-driven potentiometers which are either custom-wound to approximate an arbitrary non-linear function or sequentially actuated by means such as a multiple-output electromechanical clutching device in combination with a timer-controlled sequence-switching arrangement. This situation obviously creates a calibration and maintenance problem of great complexity, which, in view of the initially high cost, weight, and space requirements of the system, renders it quite unsatisfactory for general use.

In accordance with this invention it has been found that if one adopts the elongated source and detector arrangement of the aforesaid Patent No. 2,933,601, which inherently produces an output that is linear with fill level, and modifies the spacing between the source and detector to a certain calculable dimension whereby a certain portion of the source radiation is able to penetrate the liquid in the intervening space, the detector output becomes a substantially linear function of the product of the fill height and the density of the liquid in the tank. In order that the spacing dimension does not assume an impractical value, it is found preferable if not essential to provide a special type of elongated radiation source to be described hereinafter for specific reasons which will become apparent.

In any case where the shape of the tank is such that all horizontal sections therethrough have the same area, the gauge described, whose indication is proportional to product of fill level and density, obviously provides an output signal which is a linear function of the mass of liquid in the tank. However, this favorable situation does not always obtain in the case of aircraft fuel tanks, and accordingly the present invention further contemplates the placement of a permanent member having a varying radiation absorption profile between the source and detector to compensate the mass measurement for the irregularity of the tank shape. This varying profile is provided in a novel and simple manner as a part of the radiation source structure by a method described in detail hereinafter. Where on a given aircraft the use of a plurality of tanks of different sizes and shapes requires a plurality of fuel gauges and a computer for indicating the total mass of fuel therein, the present invention greatly simplifies the requirements of the computer, which in most cases can be reduced to an ordinary operational amplifier.

It is accordingly an object of this invention to provide simple and reliable means for directly and continuously indicating the mass of liquid in tanks.

It is also an object to provide a penetrative radiation gauge having a source and detector arrangement for providing an output signal which is substantially linearly proportional to the product of the level and the density of a liquid in which said arrangement is immersed.

It is another object to provide such a gauge having an arrangement for providing an output signal which is substantially linearly proportional to the mass of liquid in an irregularly-shaped tank.

It is still another object to provide a much simplified apparatus including linear computer means for continuously indicating the total mass of liquid in a plurality of tanks.

Further objects and advantages will become apparent from the following detailed description of certain preferred embodiments of the invention, taken in conjunction with the appended drawings, in which:

FIG. 6 is a schematic diagram of an apparatus including a simplified computer for indicating the total mass of liquid in a plurality of tanks.

FIG. 7 is a sketch showing a probe unit in accordance with the invention installed in a tank wherein the volume of liquid varies non-linearly with fill height.

FIG. 8 is a vertically foreshortened section of a portion of the probe unit of FIG. 7, showing the manner in which the probe is modified to provide a linear measure of the mass of liquid in the tank.

FIG. 9 is a showing of a modification of the invention wherein for special applications one of the basic radiation gauge elements is placed outside the tank.

Figure 1:
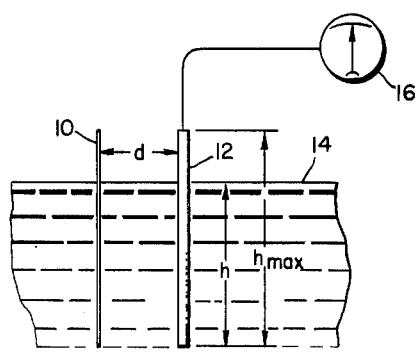
FIG. 1 is a sketch showing the basic elements of an apparatus for measuring the mass of liquid in a container in accordance with the invention.

Referring to FIG. 1, consider an elongated source 10 which may comprise a rod-like member having radioactive material uniformly distributed along the length thereof, and a radiation detector 12 such as an ionization chamber of coextensive length and uniform cross section which is spaced from the source at a distance $d$. The source and detector units are vertically disposed, and partially immersed, in a liquid 14. The immersed portion of the length is indicated by the letter $h$, the total length being indicated by $h_{max}$.

Considering a variable liquid level, when $h$ is zero, the radiation emitted by source 10 is unattenuated by liquid 14 and impinges on the detector 12 with an intensity $I_0$ over the total length $h_{max}$ and corresponding area A thereof. An indicator 16 connected to the detector 12 is energized in proportion to the total radiation received by the detector to provide a response $R_0 = AI_0$.

Now assume that the liquid level is increased to $h_{max}$ whereby the source and detector are fully immersed in the liquid, that the distance $d$ is within the penetration range of the radiation, and that said radiation is of a common type which penetrates an absorber in accordance with the classic equation $I = I_0 e^{-\mu x}$, wherein I represents the intensity of radiation at the detector with the absorbing liquid between the source and detector, $\mu$ is the mass absorption coefficient and $x$ is the absorption length which is equal to the product $\rho d$, $\rho$ representing the density of the liquid 14 in the present case. The response of the detector is then given by $R_1 = AI_0 e^{-\mu x}$.

For intermediate liquid levels, it is convenient to let $$y = A \frac{h}{h_{max}}$$

that is, the fraction of the total area of detector 12 which is immersed in the liquid to the depth $h$. The total radiation reaching the detector is then expressed as the sum of two portions, a first portion $I_0(1-y)$ passing unattenuated through the unsubmerged space and a second attenuated portion $I_0 y e^{-\mu x}$ passing through the submerged space. The detector response as registered by the indicator 16 is thus given by $$R = I_0(1-y) + I_0 y e^{-\mu x} \quad (1)$$

For suitably small values of $(\mu x)$, $(e^{-\mu x})$ may be approximated by $(1-\mu x)$, whence Equation 1 reduces to $$R = I_0(1-y) + I_0 y(1-\mu x) = I_0(1-\mu xy) \quad (2)$$

and since $x = \rho d$, $$R = I_0(1 - \mu d\rho y) \quad (3)$$

Examining Equation 3 it is recalled that $\mu$ depends only on the kind of radiation involved and the atomic constituents of the liquid. Since aircraft fuels, for example, normally vary essentially only in the degree of polymerization and not in atomic constituents, $\mu$ is substantially constant as is the spacing $d$ between the source and detector. Hence R is a substantially linear function of the product $(\rho y)$. Moreover, since $y$ is directly proportional not only to the fill height $h$ but also to the volume of liquid in the region between the source and detector, Equation 3 may be rewritten as $$R = I_0(1 - k_1 m) \quad (4)$$

where $k_1$ is a constant and $m$ is the mass of liquid in the region between the source and detector.

In order to validate the approximation of Equation 2, the product $(\mu x)$ should have a small value as aforesaid, and in general this value should be much less than unity. That is to say, the distance between the source and detector should be less than the so-called "relaxation length" whereby the radiation absorption in the fluid-filled region reduces the initial radiation intensity $I_0$ to the value $I_0/e$. The relaxation length is the distance in which the intensity of a beam of penetrating radiation (in a given medium) is reduced to a fraction $1/e$ of its initial value due to absorption in the medium (see International Dictionary of Physics and Electronics, D. Van Nostrand Company, Inc., New York, 1956).

The practical sources of radiation having exponential absorption in general comprise beta ray sources and sources of electromagnetic radiations having ionizing energies, e.g., gamma rays or X-rays. It is found that beta ray sources having suitable half-life and other characteristics are associated with a large value of $\mu$, so that the reduction of the absorption length to less than one relaxation length results in a rather impracticably small value of $d$. On the other hand, gamma ray sources of suitable half-life and other characteristics are associated with a small value of $\mu$, requiring a very wide spacing $d$. Hence the use of the gamma ray sources is likewise rather impractical, not only because of a requirement for extensive shielding, which implies prohibitive weight, but also because the source and detector cannot in general be provided in a compact, unitary structure characterized by dimensional stability and ease of installation, maintenance and replacement.

Figure 2:
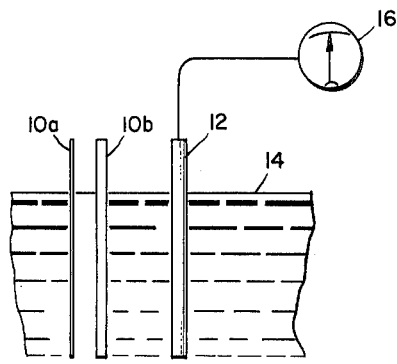
FIG. 2 is a sketch showing a modification of the apparatus of FIG. 1.
Figure 3:
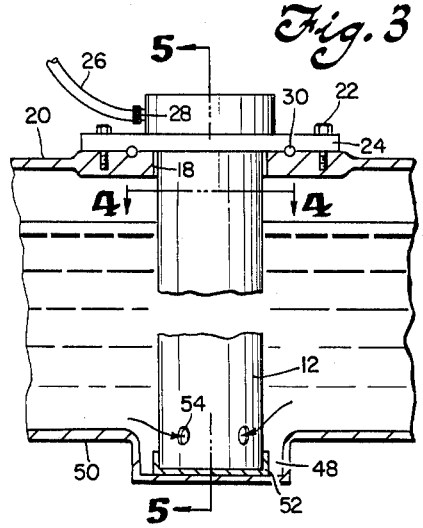
FIG. 3 is a showing of a fuel tank unit and the mounting thereof in accordance with the invention.

A satisfactory radiation source for the purpose of the present invention is provided in accordance with the teachings of Patent No. 2,933,606, and the basic structure including such a source is depicted in FIG. 2. Herein it is seen that the elongated source 10 comprises what may be termed a nuclear-powered X-ray generator including a beta radiation source 10a, and a target 10b which is interposed between the beta source and the detector 12. Beta rays from source 10a are largely absorbed by target 10b whereby a portion of their positive energies is transformed into X-rays. It is the X-rays, having an effective energy spectrum in the low kilovolt range, which are employed in the measurement, and their absorption in the fluid is characterized by a favorable intermediate value of $\mu$ which makes possible the embodiment of the present invention in a simple, compact and reliable structure such as the tank unit shown in FIGS. 3–5.

This tank unit comprises a tubular assembly which is adapted to be inserted through a flanged opening 18 in the top 20 of the tank and secured by capscrews as at 22 extending into a mounting flange 24 provided on the tank unit, which is connected to external measuring circuits via a coaxial cable 26 and connector 28. The opening 18 is sealed by an O-ring 30 seated under the flange 24.

Figure 5:
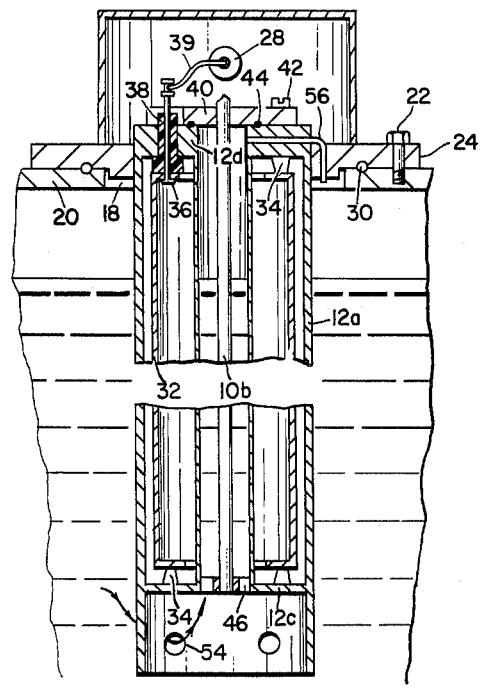
FIG. 5 is a partial section on the line 5—5 of FIG. 3.
Figure 4:
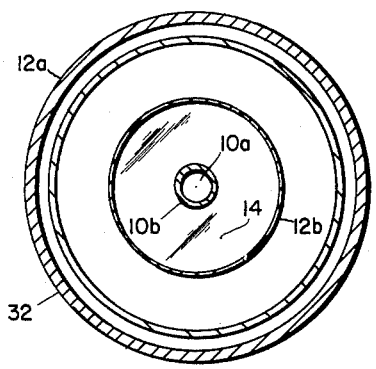
FIG. 4 is a section on the line 4—4 of FIG. 3.

As appears from FIGS. 4 and 5, the X-ray source comprises an elongated, hermetically sealed tube 10b containing radioactive krypton-85 which, being a gaseous element, is dispersed uniformly throughout the space inside the tube, and being chemically inert, would be dispersed harmlessly into the atmosphere in the event of destruction of the tube. The krypton constitutes the beta ray emitter 10a of FIG. 2 and accordingly bears the same reference numeral in FIG. 4. The enclosing wall of tube 10b constitutes the target for conversion of beta ray energy to X-rays and accordingly corresponds to target 10b of FIG. 2. Hence the wall thickness of tube 10b is preferably sufficient to stop, or absorb, about ninety-eight percent of the beta particles emitted by source 10a, but without significantly attenuating the useful X-rays generated in the tube wall.

The detector 12 is an elongated ionization chamber enclosed by a relatively thick cylindrical outer wall 12a adapted also to serve as a housing for the tank probe, a relatively thin cylindrical inner wall 12b, and bottom and top end-plates 12c and 12d respectively. The chamber contains a cylindrical probe 32, supported on suitable insulators as at 34. The probe is connected to external power supply and measuring circuits (not shown) via a post terminal 36 passing through a suitable insulating seal member 38 mounted in the top end-plate 12d, and a conductor 39 which is attached to the coaxial connector 28.

The source tube 10b extends through an opening in a top cover plate 40 and is sealingly secured therein as by brazing to form an integral assembly which is removable for source inspection or replacement. To this end, the cover plate is attached by screws as at 42 to the top end-plate 12d of the ionization chamber, and gasketed by an O-ring 44. The bottom end of the source tube is supported in a spider 46 which provides passageways for the liquid 14 to and from the space between the source tube 10b and the inner wall 12b of the ionization chamber. As illustrated, the outer chamber wall 12a may be extended, by an integral or attached portion, below the bottom end-plate 12c of the chamber to form a standpipe which sits in a suitable well 48 formed in the bottom 50 of the tank. This device permits accurate measurement all the way to the bottom of the tank per se and allows the provision of means such as a cup-socket 52 in the bottom of the well to receive the standpipe portion, thus providing additional support for the tank unit at the lower end thereof. The standpipe portion is then perforated with holes as at 54 above its terminal portion to provide passageways for liquid between the tank space and the interior of the standpipe. An air vent for the space above the column of liquid between the source and detector is provided by a vent tube 56 inserted through drilled openings in the chamber top end-plate 12d and flange 24, whereby the pressure in said space is equalized with that above the liquid in the tank.

It is to be noted that the cylindrical detector arrangement is particularly advantageous in the mass measuring instrument of the present invention. In this connection, it is recalled that the response of the detector to an empty tank is given by $R_0=AI_0$, whereas the response to a full tank is given by $R_1=AI_0e^{-\mu x}$. Hence the only usable portion of the total detector output is given by $$R_0 \sim R_1 = AI_0(1-e^{-\mu x}) \quad (5)$$

As is the usual practice, see for example Patent No. 2,965,847, the response $R_1$ is nulled, or "bucked out" in the measuring circuits by a signal in opposition to the detector output signal, so that the indicated signal varies only between the limits of zero and $R_0 \sim R_1$. In accordance with the invention, in Equation 5 the quantity $\mu x$ is deliberately made small, producing concomitant decreases in the magnitude of the usable signal and the inherent signal to noise ratio, and it is therefore highly desirable to make compensation by increasing A and/or $I_0$. The cylindrical detector is the means to maximize A, thus avoiding the necessity of greatly increasing the intensity of the radioactive source used in order to increase $I_0$.

FIG. 6 shows one arrangement including a simple computer for indicating the total mass of liquid in a plurality of tanks as at 60, 62 and 64 of different sizes containing tank probes 66, 68 and 70 in accordance with the invention. The probes are connected respectively to suitable measuring circuits 72, 74 and 76 which may be similar to that described in the aforementioned Patent No. 2,965,847. Each of these circuits is adapted to translate its associated detector response as given by Equation 3 into a relatively low impedance signal voltage output which is directly proportional to the product $(\rho y)$. These voltages are connected via summing resistors 78, 80 and 82 to the input 86 of an operational amplifier 84 having the usual resistor 88 whereby the output voltage of the amplifier is fed back to maintain the input 86 at zero potential. The output signal from the amplifier comprises a voltage analog of the total mass of liquid in the tanks 60–64, and said mass is indicated by any suitably calibrated indicator 81.

The computer is very simply calibrated by any of several obvious methods to take into account the differences in capacity of the various tanks. For example, the measuring circuits may include potentiometers (not shown) which are adjusted so that the range of variation of the output voltage from a particular measuring circuit is directly proportional to the total capacity of its associated tank, with the summing resistors 78–82 having equal values. Likewise said range of voltage variation may be made alike for all the measuring circuits, with each summing resistor having a value inversely proportional to the capacity of its associated tank. Or, the range of voltage variation may be allowed to remain arbitrary, with each summing resistor having a value inversely proportional to the product of said range of variation for its associated measuring circuit and the capacity of its associated tank. With any of these arrangement, it is apparent that both the computer and the calibration of the system are quite simple and inexpensive by comparison with prior art arrangements.

In the foregoing description of apparatus in accordance with the invention, it has been assumed that the volume of liquid in the tanks varies linearly with the fill height $h$. However, particularly as found in aircraft, the tanks frequently have regular or irregular shapes such that this favorable situation does not obtain. One rather extreme example of a situation wherein the volume varies non-linearly with $h$ is provided by a tank having the shape of a simple horizontal cylinder, as show at 90 in FIG. 7.

In this case, the tank unit 92 in accordance with the invention is modified as shown in FIG. 8.

Whereas in FIGS. 1, 2 and 5 the radiation source arrangement provides a radiation intensity $I_0$ which is uniform from the top to the bottom of the detector, in FIG. 8 a shaped absorber is placed between the source tube and the inner wall $12b$ of the ionization chamber whereby $I_0$ is made to vary as a function of fill height. More specifically, the absorber is shaped so that the radiation $I_0$ (which by definition is the radiation intensity in the absence of intervening fluid) incident on the annular differential area of the chamber having the height $dh$, FIG. 8, is proportional to the volume of liquid in the differential layer, FIG. 7, having the thickness $dh$.

Obviously the shaped absorber may comprise a separate member installed around a source tube having the uniform thickness $t$ for optimum X-ray production as hereinabove described. Or, as illustrated, the radiation absorption is adjusted by simply turning a variable profile into the casing of the radiation source tube $10b'$.

It will be apparent that the principle of the device of FIGS. 7 and 8 may be adapted to many other tank configurations to provide an output which is linear with the mass of liquid in the tank, whereby the simple computer of FIG. 6 is adaptable to all multiple tank installations.

The present invention, moreover, is uniquely applicable to vessels wherein the contents are simultaneously existent in two or more phases. For example, with reference to FIG. 9 consider a vigorously boiling liquid $14a$. Here the liquid level itself is indistinct, and the bulk density of the mixture of liquid plus bubbles is indeterminate, so that a mass measurement such as that provided in accordance with the invention is the only true representation of the amount of liquid in the vessel. In order to avoid subjecting the detector to the rigorous ambient conditions inside, the detector 12 is placed outside the vessel. In this case, the absorption length for the radiation in the liquid is determined by the distance $d$ separating the source 10 from the tank wall 94. Since the radiation absorption in the wall 94 is constant, the basic mode of operation of the invention is unchanged.

Another example of a situation where it is desirable to place the detector outside the tank is in the measurement of cryogenic fluids, where the internal conditions may be such as to freeze out the gaseous filling of the detector and render it useles. It is further anticipated that under certain conditions it may be desirable to reverse the positions of the source and detector as shown in FIG. 9, locating the source outside the tank and the detector on the inside thereof.

While the invention has been shown and described as embodied in specific apparatus, such showing and description is meant to be illustrative only and not restrictive, since obviously many changes, modifications and outwardly different embodiments can readily be made without departing from the spirit and scope of the invention as is set forth in the appended claims.

What is claimed is:

1. The combination, with a tank containing liquid having a variable density and wherein the fill level of said liquid varies between a high level and a low level, of means responsive to the product of said variable density and said variable fill level for indicating the mass of said liquid in said tank, said responsive means comprising a source of penetrative radiation and a radiation detector each extending from said high level to said low level, the distance between said source and said detector being less than one relaxation length for said radiation in said liquid, said detector producing a signal that is a function of the product of the liquid density and level and is substantially linearly responsive to the mass of said liquid said detector having an indicator calibrated in units of mass and coupled to said signal to readout said liquid mass.

2. Apparatus for measuring a characteristic of a liquid in a tank wherein the liquid level varies between a high level and a low level and wherein the volume of said liquid varies non-linearly with said level, comprising a source of penetrative radiation and a radiation detector each extending lengthwise from said high level to said low level, said source comprising a gaseous material including a radioisotope emitting beta rays and a sealed tube for containing said material and having a wall thickness sufficient to absorb a major portion of said rays and produce X-rays for detection by said detector, said tube wall thickness varying along said length in inverse proportion to said non-linear variation of said volume with said level.

3. The combination, with a tank containing liquid having a variable density and wherein the fill level of said liquid varies between a high level and a low level, of means responsive to the product of said variable density and said variable fill level for indicating the mass of said liquid in said tank, said responsive means comprising a source of penetrative radiation, including a radioisotope emitting beta rays, and a target in the path of said beta rays for converting a portion of the energy thereof to X-rays, said X-rays constituting said penetrative radiation, and a radiation detector, each of said source and detector extending from said high level to said low level, the distance between said source and said detector being less than one relaxation length for said radiation in said liquid, said detector producing a signal that is a function of the product of the liquid density and level and is substantially linearly responsive to the mass of said liquid, said detector having an indicator calibrated in units of mass and coupled to said signal to readout said liquid mass.

4. The combination, with a tank containing liquid having a variable density and wherein the fill level of said liquid varies between a high level and a low level, of means responsive to the product of said variable density and said variable fill level for indicating the mass of said liquid in said tank, said responsive means comprising a source of penetrative radiation, including a radioisotope emitting beta rays, and a target in the path of said beta rays for converting a portion of the energy thereof to X-rays, said X-rays constituting said penetrative radiation, said target comprising a sealed tube having a wall thickness sufficient to absorb a major portion of said beta rays, said radioisotope comprising a gaseous material filling said tube, a radiation detector, each of said source and detector extending from said high level to said low level, the distance between said source and said detector being less than one relaxation length for said radiation in said liquid, said detector producing a signal that is a function of the product of the liquid density and level and is substantially linearly responsive to the mass of said liquid, said detector having an indicator calibrated in units of mass and coupled to said signal to readout said liquid mass.

5. The combination, with a tank containing liquid having a variable density and wherein the fill level of said liquid varies between a high level and a low level, of means responsive to the product of said variable density and said variable fill level for indicating the mass of said liquid in said tank, said responsive means comprising a source of penetrative radiation, and a radiation detector, said detector comprising radiation sensitive means radially surrounding said source and enclosing a columnar space around the same, said apparatus including means adjacent to said low level for admitting said liquid into said space, each of said source and detector extending from said high level to said low level, the distance between said source and said detector being less than one relaxation length for said radiation in said liquid, said detector producing a signal that is a function of the product of the liquid density and level and is substantially linearly responsive to the mass of said liquid, said detector having an indicator calibrated in units of mass and coupled to said signal to readout said liquid mass.

References Cited by the Examiner

UNITED STATES PATENTS

| | | | |
|---|---|---|---|
| 2,722,609 | 11/1955 | Morgan | 250—43.5 |
| 2,765,410 | 10/1956 | Herzog | 250—43.5 |
| 2,830,183 | 4/1958 | Wolfe | 250—43.5 |
| 2,884,538 | 4/1959 | Swift | 250—83.3 |
| 2,908,819 | 10/1959 | Marx | 250—83.6 |
| 2,933,601 | 4/1960 | Friedman | 250—43.5 |
| 2,933,606 | 4/1960 | Foster | 250—83.3 |
| 2,952,774 | 9/1960 | Howard | 250—83.6 |
| 2,964,628 | 12/1960 | Ohmart | 250—43.5 |
| 3,111,581 | 11/1963 | Vollhardt | 250—43.5 |

FOREIGN PATENTS 738,329　10/1955　Great Britain.

RALPH G. NILSON, *Primary Examiner.*

JAMES W. LAWRENCE, *Examiner.*